United States Patent
Haouas

(10) Patent No.: US 11,643,149 B2
(45) Date of Patent: May 9, 2023

(54) WELDED STEEL PART USED AS MOTOR VEHICLE PART, AND METHOD OF MANUFACTURING SAID WELDED STEEL PART

(71) Applicant: ArcelorMittal, Luxembourg (LU)

(72) Inventor: Jessy Haouas, Saint Ail (FR)

(73) Assignee: ArcelorMittal, Luxembourg (LU)

( * ) Notice: Subject to any disclaimer, the term of this patent is extended or adjusted under 35 U.S.C. 154(b) by 358 days.

(21) Appl. No.: 16/770,579

(22) PCT Filed: Dec. 4, 2018

(86) PCT No.: PCT/IB2018/059614
§ 371 (c)(1),
(2) Date: Jun. 5, 2020

(87) PCT Pub. No.: WO2019/123069
PCT Pub. Date: Jun. 27, 2019

(65) Prior Publication Data
US 2021/0163080 A1     Jun. 3, 2021

(30) Foreign Application Priority Data
Dec. 21, 2017   (CH) .................. PCT/IB2017/058270

(51) Int. Cl.
*B23K 35/00* (2006.01)
*B62D 29/00* (2006.01)
(Continued)

(52) U.S. Cl.
CPC ......... *B62D 29/007* (2013.01); *B21D 22/208* (2013.01); *B21D 53/88* (2013.01);
(Continued)

(58) Field of Classification Search
CPC .......... B23K 2101/006; B23K 2101/18; B23K 2101/34; B23K 2103/04; B23K 33/008; B23K 33/002
See application file for complete search history.

(56) References Cited

U.S. PATENT DOCUMENTS 9,902,429 B2    2/2018 Okada et al.
11,401,577 B2*  8/2022 Blaise ...................... F27B 9/24
(Continued)

FOREIGN PATENT DOCUMENTS

CN    107074292 A    8/2017
DE    3815068 A1    11/1989
(Continued)

OTHER PUBLICATIONS

International Search Report of PCT/IB2018/059614, dated Jan. 4, 2019.

*Primary Examiner* — Erin B Saad
(74) *Attorney, Agent, or Firm* — Davidson, Davidson & Kappel, LLC

(57) ABSTRACT

A welded steel part obtained by welding a first sheet with a second sheet, at least one with a coating of aluminum alloy. The welding uses a welding wire which, after melting and cooling, constitutes a weld bead connecting the first sheet to the second sheet and being part of said welded steel part. The respective peripheral edge of the first and second sheets are in a joggled edge type configuration in which the peripheral edge of the first sheet is arranged above, and on or near the upper face of an end portion of the peripheral edge of the second sheet which is extended by an inclined junction portion, at least one part of the upper face of the inclined junction portion delimits at least laterally with the edge of the peripheral edge of the first sheet a groove receiving the weld bead, the inclined joining portion extending by a (Continued)

welding portion in longitudinal continuity with the peripheral edge of the first sheet.

11 Claims, 6 Drawing Sheets

(51) Int. Cl.
| | |
|---|---|
| *B23K 26/244* | (2014.01) |
| *B21D 53/88* | (2006.01) |
| *B23K 33/00* | (2006.01) |
| *B62D 65/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/54* | (2006.01) |
| *B21D 22/20* | (2006.01) |
| *B23K 9/16* | (2006.01) |
| *B23K 26/322* | (2014.01) |
| *B23K 103/04* | (2006.01) |
| *B23K 101/00* | (2006.01) |
| *B23K 101/18* | (2006.01) |
| *B23K 101/34* | (2006.01) |
| *B23K 9/02* | (2006.01) |
| *B23K 35/30* | (2006.01) |
| *C21D 7/02* | (2006.01) |
| *C21D 7/13* | (2006.01) |

(52) U.S. Cl.
CPC ............ *B23K 9/16* (2013.01); *B23K 26/244* (2015.10); *B23K 26/322* (2013.01); *B23K 33/00* (2013.01); *B23K 33/008* (2013.01); *B62D 65/005* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C22C 38/54* (2013.01); *B23K 9/02* (2013.01); *B23K 33/002* (2013.01); *B23K 35/3026* (2013.01); *B23K 2101/006* (2018.08); *B23K 2101/18* (2018.08); *B23K 2101/34* (2018.08); *B23K 2103/04* (2018.08); *C21D 7/02* (2013.01); *C21D 7/13* (2013.01)

(56) References Cited

U.S. PATENT DOCUMENTS

| | | | |
|---|---|---|---|
| 11,434,541 B2* | 9/2022 | Magar | C22C 38/04 |
| 11,466,335 B2* | 10/2022 | Uta | C21D 8/0205 |
| 11,549,163 B2* | 1/2023 | Barges | C21D 9/46 |
| 11,555,226 B2* | 1/2023 | Mohanty | C21D 6/005 |
| 2014/0152053 A1* | 6/2014 | Watanabe | B62D 25/2036 296/193.06 |
| 2016/0214649 A1 | 7/2016 | Masahiko et al. | |
| 2017/0247071 A1 | 8/2017 | Schneider et al. | |
| 2017/0298469 A1 | 10/2017 | Teague | |

FOREIGN PATENT DOCUMENTS

| | | |
|---|---|---|
| EP | 0049845 A1 | 4/1982 |
| JP | 2009196488 A | 9/2009 |
| JP | 2013000745 A | 1/2013 |
| JP | 2016055659 A | 4/2016 |
| JP | 2017047446 A | 3/2017 |
| RU | 2615648 C1 | 4/2017 |
| RU | 2627082 C2 | 8/2017 |
| WO | WO2013008515 A1 | 1/2013 |

* cited by examiner

WELDED STEEL PART USED AS MOTOR VEHICLE PART, AND METHOD OF MANUFACTURING SAID WELDED STEEL PART

The invention relates mainly to a hot pressed formed and further welded steel part of high mechanical resistance.

The invention concerns also a hot-pressed formed steel part used for manufacturing said welded steel part.

The invention concerns also a method of manufacturing the welded steel part and the use of this welded steel part for making suspension arms and/or frame parts of a motor vehicle.

BACKGROUND

It is a known practice to prepare welded steel parts from steel sheets having different thicknesses and/or different compositions by a continuous welding of their respective peripheral edges. Such welded steel parts are found in particular in the motor industry and more particularly for making suspension arms or chassis parts of motor vehicles.

It is essential that these welded steel parts have a high mechanical resistance to comply with the stresses to which they are submitted to during their service life. With regard to the applications as required in the automobile domain, the invention deals with a welded steel part obtained by welding a first sheet with a second sheet wherein at least one of the first and second sheets is hot-press formed and made of a steel substrate and comprises a coating of aluminum alloy.

Different welding techniques involving a welding wire are known: for example arc welding processes, laser welding process or hybrid laser welding processes, i.e. Laser welding combined with arc welding. For arc welding of sheets with thicknesses in the range between 1.5 and 4 mm, Gas Metal Arc Welding (GMAW), Gas Tungsten Arc Welding (GTAW) and Plasma Arc Welding are already known. As also known, after melting and cooling, welding with a filler wire makes it possible to obtain a weld bead connecting the first sheet to the second sheet and being part of a said welded steel part.

With reference to FIG. 1, a butt welding technique is known which consists of longitudinal alignment of the respective peripheral edges $0_{2a}$, $0_{3a}$ of a first $0_2$ and second $0_3$ metal sheets forming one welded steel part $0_1$ after welding and cooling of the weld bead $0_4$. Two zones are highlighted here on this welded steel part. The first zone corresponds to the zone occupied by the weld bead $0_4$ which has been submitted to a process of fusion during the welding operation. This is known as the fused zone Z1. The second zone is the one which has been thermally affected during the operation of welding where the temperature reached more than about 700 degrees C. This zone is known as the Heat Affected Zone (HAZ) Z2 and is adjacent to the fused zone Z1 on the side of the first sheet plate $0_2$ and on the side of the second sheet plate $0_3$. In this heat affected zone Z2, the microstructure and the mechanical properties are modified by the local welding thermal cycle.

In order to evaluate the mechanical resistance of the welded steel part $0_1$, it is usual to perform tensile testing as shown by the arrows F on FIG. 1 illustrating the tensile efforts, up to the fracture of the welded steel part. The mechanical characteristics of the welded zone is then evaluated by measuring the Ultimate Tensile Stress (UTS) of this welded steel part subjected to the aforementioned tensile efforts and by observing if the fracture occurs or not in the fused zone Z1. As quality criteria of the welds fabricated for the automobile industry, it is often requested that UTS must be higher than 700 MPa and that the fracture does not occur in the fused zone.

SUMMARY OF THE INVENTION

Mechanical tensile testing of a welded part of the type illustrated in FIG. 1 has been carried out. The first $0_2$ and second $0_3$ sheet are aluminized 22MnB5 type steel sheets commercialised under the tradename USIBOR®1500, which have been hot-press formed so to obtain hardening by quenching and so to obtain an Ultimate Tensile Stress of approximately 1500 MPa. When welding is performed with a filler wire adapted to the welding of High Yield Strength steels, the fracture occurs outside of the fused zone and UTS is comprised between 880 and 910 MPa.

Although these mechanical characteristics of the butt welded steel part shown in FIG. 1 are acceptable, this configuration nevertheless presents some difficulty in the industrial realisation of such welded steel part. Taking into account the configuration of the butt weld and the necessity of clamping the sheets in this configuration during the operation of welding, the implementation of the bead is difficult. This is particularly the case when the thicknesses and/or the geometrical shape of the sheet plates differ.

With reference to FIGS. 2 and 3, it is also known the overlapping welding technique which consists in positioning the peripheral edge $0_{3a}$ of the second sheet $0_3$ on the peripheral edge $0_{2a}$ of the first sheet $0_2$. Thus, as shown on FIG. 2, a support is realized (the edge $02a$ of the first sheet $02$) which enables to simplify the welding operation and to adapt this operation to different configurations of the sheet parts. However, when applied to aluminized steel sheets, this overlap welding technique presents drawbacks with respect to mechanical properties of the welds.

To illustrate these difficulties, tensile tests on a welded steel part as shown in FIG. 2 have been conducted. As for the tests carried out on a butt welded part, these tests consist of applying two opposite forces as illustrated by the arrows F up to the rupture of the welded steel part. The UTS of the welded steel part and the localization of the fracture zone are noted. The first $0_2$ and second $0_3$ sheets tested are the sheets commercialised under the tradename USIBOR®1500 which have a mechanical resistance UTS of approximately 1500 MPa after hot press forming. The tests are carried out on welded steel parts wherein the two hot press formed sheets have a thickness of 1.5 mm, and on welded steel parts wherein the two hot press formed sheets have a thickness of 3.2 mm. This former thickness is particularly used in the automotive industry. The welds are done with an ER70S-G and an ER120S-G filler wires, these designations being in reference to the standard AWS-A5.28.

For the 1.5 mm thick sheets and the ER70S-G wire, UTS is close to 800 MPa and the fracture takes place either in the fused zone Z1 or in the heat affected zone Z2. For the 1.5 mm thick sheets and the ER120S-G wire, UTS is close to 900 MPa and the fracture takes place in the heat affected zone Z2. For the sheet parts with a thickness of 3.2 mm, the mechanical resistance is approximately of 550 MPa for the ER70S-G wire and the rupture occurs systematically in the fused zone Z1. The ER120S-G wire leads to UTS of 630 MPa and fracture still occurs in the fused zone Z1.

Thus, it can be concluded that UTS tends to be reduced with higher thicknesses, and that the fracture location is displaced from the HAZ or the fusion zone toward the fused zone. It can also be concluded that the overlapping welding technique leads to heterogeneous results in terms of rupture location and UTS, depending on the thickness of the sheets and on the wires used. Furthermore, a phenomenon of rotation of the steel part around the weld bead $0_4$ occurs during the application of the tensile forces. As shown in FIG. 2, the two tensile efforts are not aligned as a consequence of the overlapping of the two sheets. The main stresses follow a path from the lower sheet $0_2$ towards the upper sheet $0_3$. Thus, the two sheet plates thereby tend to align each with respect to the other one, and the welded steel part is found in the configuration shown in FIG. 3 wherein the root $0_{4c}$ of the weld bead $0_4$ is subjected to high stresses. Since welding is performed on steel sheets $0_2$, $0_3$ with aluminium coating, aluminium is molten and incorporated in the molten zone during welding and can be concentrated in some regions such as the weld root. Since aluminium is alphagene, the presence of this element in the root can cause the formation of softer components such as ferrite, as compared to the harder constituents (such as martensite, bainite) which are the major component of the weld. As a consequence of the overlap geometry and of the presence of ferrite in the root, in the weld subject to tensile efforts, the strain is concentrated within ferrite or at the interface between ferrite and the matrix, thus initiating fracture in the fused zone Z1 and resulting in low mechanical resistance of the welded steel part. One possible solution for overcoming this problem is to perform partial or total ablation of the aluminium coating of the respective peripheral edges of the two sheets before welding, so to avoid, or at least to limit, the presence of ferrite in the weld bead. However, this solution causes additional costs.

Thus, even if the overlap configuration makes welding easier, this configuration would involve heterogeneous results depending on the thickness of the sheets and on the wires used, and most of the time inadequate mechanical properties for the resulting welded steel part when applied to hot pressed formed aluminized sheets.

Thus, it is desired to have a welding process of aluminized sheets which would not cause the difficulties aforementioned. In this context, the invention relates to a welded steel part having an Ultimate Tensile Stress higher than 700 MPa for thin thicknesses between 1 and 4 mm for which the welding operations are easy to accomplish for different thicknesses, related conformation of the first sheet respected with the second sheet, and compositions of the sheets.

The invention concerns also a method of manufacturing such welded steel part which is both simple and not costly.

To this end, the invention relates to a welded steel part obtained by welding a first sheet with a second sheet, at least one of the first and second sheet is made of a steel substrate and comprises a coating of aluminum alloy, said welding using a welding wire which, after melting and cooling, constitutes a weld bead connecting the first sheet to the second sheet and being part of said welded steel part, wherein at least one of the first and second sheet is a hot-pressed formed part, wherein the respective peripheral edge of the first and second sheets are in a joggled edge type configuration in which the peripheral edge of the first sheet is arranged above, and on or near the upper face of an end portion of the peripheral edge of the second sheet which is extended by an inclined junction portion, at least one part of the upper face of the inclined junction portion delimits at least laterally with the edge of the peripheral edge of the first sheet a groove receiving the weld bead, the inclined joining portion extending by a welding portion in longitudinal continuity with the peripheral edge of the first sheet, wherein the longitudinal continuity is defined by a longitudinal alignment of at least part of a mid-thickness zone of the welding portion with at least part of a mid-thickness zone of the peripheral edge of the first sheet, and wherein the longitudinal alignment of the mid-thickness zones is defined by the position on the edge of the peripheral edge of the first sheet of a projection point of at least one straight line which is parallel to the mid-thickness surface zone of the second sheet and which is located in the corresponding mid-thickness zone, said position being located within the mid-thickness zone of the first sheet, wherein each said mid-thickness zone is defined in cross section by a zone centred on the mid-thickness of the corresponding sheet, having a thickness equal to 40% of the thickness of the respective sheets.

The welded steel part of the invention may also comprise the following optional characteristics considered separately or according to all possible technical combinations:

the upper face of the peripheral edge of the first sheet and the upper face of the welding portion of the peripheral edge of the second sheet are parallel;

the first and second sheets have the same thickness, and the upper face of the peripheral edge of the first sheet and the upper face of the welding portion of the peripheral edge of the second sheet are in longitudinal alignment;

the two opposite weld toes of the weld bead respectively located on the upper face of the peripheral edge of the first sheet and on the upper face of the peripheral edge of the second sheet are in longitudinal alignment;

the inclined junction portion of the peripheral edge of the second sheet forms an angle with the longitudinal mid-thickness surface of said second sheet which is comprised between 120 and 160°, preferably between 130 and 150°;

wherein the microstructure of the weld bead comprises ferrite at least at the root of said weld bead;

at least the second sheet comprises a coating made of aluminum alloy;

the microstructure of at least one of the first and second sheet comprises a coating made of aluminum alloy, comprises martensite;

the chemical composition of at least one of the first and second sheet comprises, in weight: 0.04≤C≤0.1%, 0.3%≤Mn≤2%, Si≤0.3%, Ti≤0.8%, 0.015%≤Nb≤0.1%, Cr, Ni, Cu, Mo≤0.1%, the remainder being Fe and unavoidable impurities;

the chemical composition of at least one of the first and second sheet comprises, in weight: 0.06≤C≤0.10%, 1.4%≤Mn≤1.9%, 0.2%≤Si≤0.5%, 0.020%≤Al≤0.070%, 0.02%≤Cr≤0.1% wherein: 1.5%≤(C+Mn+Si+Cr)≤2.7%, 0.040%≤Nb≤0.060%, 3.4×N≤Ti≤8×N, wherein: 0.044%≤(Nb+Ti)≤0.090%, 0.0005≤B≤0.004%, 0.001%≤N≤0.009%, 0.0005%≤S≤0.003%, 0.001%≤P≤0.020%, optionally: 0.0001%≤Ca≤0.003%, the remainder being Fe and unavoidable impurities;

alternatively, the chemical composition of at least one of the first and second sheet comprises, in weight: 0.20≤C≤0.25%, 1.1%≤Mn≤1.4%, 0.15%≤Si≤0.35%, 0.020%≤Al≤0.070%, Cr≤0.3%, 0.020%≤Ti≤0.060%, B<0.010%, the remainder being iron and unavoidable impurities;

alternatively, the chemical composition of at least one of the first and second sheet comprises, in weight: 0.24%≤C≤0.38%, 0.40%≤Mn≤3%, 0.10%≤Si≤0.70%, 0.015≤Al≤0.070%, 0%≤Cr≤2%, 0.25%≤Ni≤2%, 0.015%≤Ti≤0.10%, 0%≤Nb≤0.060%, 0.0005%≤B≤0.0040%, 0.003%≤N≤0.010%, 0.0001%≤S≤0.005%, 0.0001%≤P≤0.025%, it being understood that the titanium and nitrogen content satisfy: Ti/N>3.42, and that the carbon, manganese, chromium and silicon contents satisfy $$2.6\,C + \frac{Mn}{5.3} + \frac{Cr}{13} + \frac{Si}{15} \geq 1.1\%,$$

the chemical composition optionally comprising one or more of the following elements: 0.05%≤Mo≤0.65%, 0.001%≤W≤0.30%%, 0.0005%≤Ca≤0.005%, the remainder consisting of iron and unavoidable impurities originating from the production, the sheet containing a nickel content $Ni_{surf}$ in the region of the surface of said sheet over a depth Δ, such that: $Ni_{surf} > Ni_{nom}$, $Ni_{nom}$ denoting the nominal nickel content of the steel, and such that $Ni_{max}$ denoting the maximum nickel content within Δ:

$$\frac{(Ni_{max} + Ni_{nom})}{2} \times (\Delta) \geq 0.6,$$

and such that:

$$\frac{(Ni_{max} - Ni_{nom})}{\Delta} \geq 0.01,$$

the depth Δ being expressed in micrometers, the $Ni_{max}$ and $Ni_{nom}$ contents being expressed as weight percentages;
  the steel substrate of the first and second sheets have the same chemical composition;
  the thickness of the first and second sheets is between 1.5 and 4 mm;
  the thickness of said first and second sheets is between 1.5 and 3 mm and said welded steel part has an Ultimate Tensile Stress (UTS) higher than 800 MPa;
  the thickness of said first and second sheets is between 2 and 4 mm and said welded steel part has an Ultimate Tensile Stress (UTS) higher than 700 MPa.

The invention also relates to a hot pressed steel part, wherein said second sheet is in a joggled edge type configuration wherein the peripheral edge of said second sheet comprises an end portion which is extended by an inclined junction portion extending by a central portion which is parallel to the end portion and transversally spaced by a distance of no more than 10 millimeters from said end portion, wherein the added length of the end portion and of the inclined junction portion is no more than 50 millimeters, and wherein the inclined junction portion forms an angle with the central portion which is comprised between 120 and 160°, preferably between 130 and 150°.

The hot pressed steel part of the invention may also comprise the following optional characteristics considered separately or according to all possible technical combinations:
  said hot pressed steel part has an Ultimate Tensile Stress (UTS) equal to or higher than 500 MPa;
  said hot pressed steel part has an Ultimate Tensile Stress (UTS) higher than 1000 MPa;
  said hot pressed steel part has an Ultimate Tensile Stress (UTS) higher than 1500 MPa;
  said hot pressed steel part comprises a coating of aluminum alloy.

The invention further relates to a method of manufacturing a welded steel part as recited above, comprising the steps of:
  i) supplying a first and a second steel sheets, at least one of the first and second steel sheets being made of a steel substrate and comprising a coating of aluminum alloy, and being hot-press formed,
  ii) deforming the peripheral edge of the second steel sheet to create an end portion which is extended by an inclined junction portion to a welding portion,
  iii) positioning a peripheral edge of the first sheet above, and on or near the upper face of the end portion of the peripheral edge of the second sheet so as to create a groove laterally delimited by at least one part of the upper surface of the inclined junction portion of the peripheral edge of the second sheet and the edge of the peripheral edge of the first sheet,
  iv) welding the first and second steel sheets thus positioned by using a filler wire which is deposited in the groove previously made, the end portion of the peripheral edge of the second sheet being a welding support sheet.

The method of the invention may also comprise the following optional characteristics considered separately or according to all possible technical combinations:
  the step of deforming the peripheral edge of the second sheet is carried out by cold forming or bending;
  the step of deforming the peripheral edge of the second sheet is carried out by hot press forming prior to the step of supplying the first and second steel sheets;
  the step of hot press forming of the peripheral edge of the second sheet is carried out at the same time as the hot press forming step of said second sheet;
  the peripheral edge of the first sheet is spaced apart with a maximal gap of 2 mm from the end portion of the peripheral edge of the second sheet;
  when positioning the peripheral edge of the first sheet above, and on or near the end portion of the peripheral edge of the second sheet, the edge of the first sheet is longitudinally arranged at the junction between the end portion and the inclined junction portion of the peripheral edge of the second sheet, or at a maximum distance of 2 mm from said junction on the side of the said end portion;
  when positioning the peripheral edge of the first sheet above, and on or near the end portion of the peripheral edge of the second sheet, the upper face of the peripheral edge of the first sheet and the upper face of the welding portion of the peripheral edge of the second sheet are arranged in longitudinal alignment;
  the chemical composition of at least one of the first and second sheets comprises, in weight: 0.20≤C≤0.25%, 1.1%≤Mn≤1.4%, 0.15%≤Si≤0.35%, 0.020%≤Al≤0.070%, Cr≤0.3%, 0.020%≤Ti≤0.060%, B<0.010%, the remainder being iron and unavoidable impurities;
  the chemical composition of at least one of the first and second sheets comprises, in weight: 0.24%≤C≤0.38%, 0.40%≤Mn≤3%, 0.10%≤Si≤0.70%, 0.015≤Al≤0.070%, 0%≤Cr≤2%, 0.25%≤Ni≤2%, 0.015%≤Ti≤0.10%, 0%≤Nb≤0.060%, 0.0005%≤B≤0.0040%, 0.003%≤N≤0.010%, 0.0001%≤S≤0.005%, 0.0001%≤P≤0.025%, it being understood that the titanium and nitrogen content satisfy: Ti/N>3.42, and that the carbon, manganese, chromium and silicon contents satisfy $$2.6\,C + \frac{Mn}{5.3} + \frac{Cr}{13} + \frac{Si}{15} \geq 1.1\%,$$

the chemical composition optionally comprising one or more of the following elements: 0.05%≤Mo≤0.65%, 0.001%≤W≤0.30%%, 0.0005%≤Ca≤0.005%, the remainder consisting of iron and unavoidable impurities originating from the production, the sheet containing a nickel content $Ni_{surf}$ in the region of the surface of said sheet over a depth $\Delta$, such that: $Ni_{surf} > Ni_{nom}$, $Ni_{nom}$ denoting the nominal nickel content of the steel, and such that $Ni_{max}$ denoting the maximum nickel content within $\Delta$:

$$\frac{(Ni_{max} + Ni_{nom})}{2} \times (\Delta) \geq 0.6,$$

and such that:

$$\frac{(Ni_{max} - Ni_{nom})}{\Delta} \geq 0.01,$$

the depth $\Delta$ being expressed in micrometers, the $Ni_{max}$ and $Ni_{nom}$ contents being expressed as weight percentages;

the welding process is an arc welding process, a laser welding process or a hybrid laser welding process using a shielding gas;

the arc welding process is Gas Metal Arc Welding, Gas Tungsten Arc Welding or Plasma Arc Welding;

the chemical composition of the filler wire comprises, in weight 0.03≤C≤0.14%, 0.9≤Mn≤2.1% and 0.5≤Si≤1.30%, the remainder being iron and unavoidable impurities;

the diameter of the filler wire is comprised between 0.8 and 2 mm;

welding process is performed with a welding speed less than 1.5 m/min, and the linear welding energy is comprised between 1.5 and 10 kJ/cm.

Finally, the invention also relates to the use of the welded part as described above, for making suspension arms or chassis parts for motor vehicle.

BRIEF DESCRIPTION OF THE DRAWINGS

Other characteristics and advantages of the invention will emerge clearly from the description that is given below by way of an indication and which is in no way restricted with reference to the appended figures in which:

FIG. 12a shows the step of supplying a first and second steel sheets. FIG. 12b shows the step of deforming the peripheral edge of the second steel sheet allowing to make the hot-pressed steel of the invention. FIG. 12c shows the step of positioning the peripheral edge of the first sheet above and near to the upper face of the end portion of the peripheral edge of the second sheet. FIG. 12d shows the step of welding the first and second steel sheets thus positioned by using a filler wire. FIG. 12e shows the welded steel part made by the method of the invention.

DETAILED DESCRIPTION

The invention aims notably at proposing a welded steel part obtained by welding a first sheet with a second sheet. At least one of the first and second sheets is made of a steel substrate and comprises a coating of aluminum alloy. Within the context of the invention, aluminium alloy is defined as containing at least 30% of aluminium by weight in average, as measured with respect to the coating layer. The welding operation uses a welding wire which, after melting and cooling, constitutes a weld bead connecting the first sheet to the second sheet and being part of said welded steel part.

Figure 4:
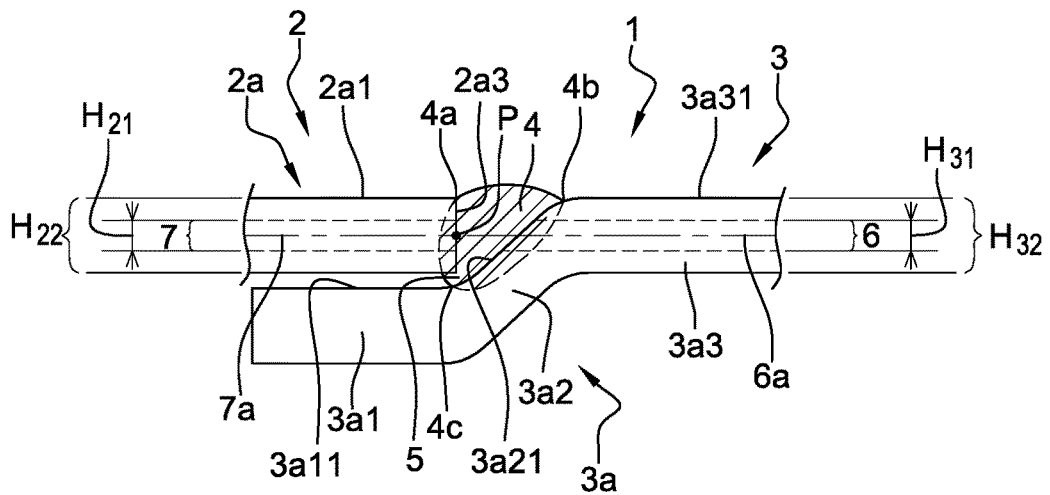
FIG. 4 shows schematically the welded steel part according to the invention in a first preferential variant for which the first and second sheets are in a joggled edge configuration.
Figure 5:
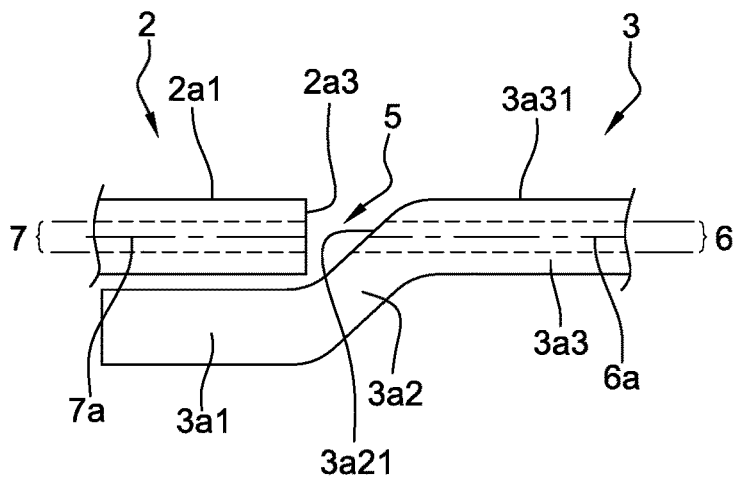
FIG. 5 shows schematically the welded steel part of the invention of FIG. 4 represented without the weld bead, for sake of simplicity.

According to the invention and referring to FIGS. 4 and 5, at least one of the first 2 and second 3 sheets is a hot-pressed formed part according to the usual manufacturing operation of structural parts and safety parts in the automobile field. Furthermore, the respective peripheral edge 2a, 3a of the first 2 and second 3 sheets are in a joggled edge type configuration. Such a joggled edge configuration may be defined by the arrangement of the peripheral edge 2a of the first sheet 2 above, and on or near the upper face 3a11 of the peripheral edge 3a of the second sheet 2. More precisely, the peripheral edge 3a has a particular geometry substantially in "S" shape comprising an end portion 3a1 which is extended by an inclined junction portion 3a2 extending by a welding portion 3a3. At least one part of the upper face 3a21 of the inclined junction portion 3a2 delimits at least laterally with the edge 2a3 of the peripheral edge 2a of the first sheet 2 a groove 5 (FIG. 5) receiving the weld bead 4 (FIG. 4).

Moreover, the welding portion 3a3 is in longitudinal continuity with the peripheral edge 2a of the first sheet 2. This longitudinal continuity is essential to avoid that the fracture generated by the tensile stresses does occur in the fused zone Z1, and to ensure that the welded steel part has a mechanical resistance greater than 700 MPa.

This longitudinal continuity is firstly defined by at least a partial alignment of the central fibres in the first and second sheets, or more precisely of the central fibres of the first sheet and of the welded portion 3a3 of the peripheral edge 3a of the second sheet 2. A central fibre of a sheet is defined as the central zone located on a mid-thickness zone of the corresponding sheet.

This longitudinal continuity is defined by a longitudinal alignment of at least a part of the mid-thickness zone 6 of the welding portion 3a3, with at least a part of the mid-thickness zone 7 of the peripheral edge 2a of the first sheet 2. Each mid-thickness zone 6,7 is defined in cross section by a thickness $H_{21}, H_{31}$ centred on the mid-thickness surface 6a,7a of the corresponding sheet 2,3. The thickness of these mid-thickness zones 6, 7 is defined as being equal to 40% of the respective sheet 2 or 3. The longitudinal alignment of the mid-thickness zones 6, 7 is defined in the following way: the virtual prolongation of the planes delimiting the mid-thickness zone 6, intersect the edge 2a3 of the first sheet 2. These intersections are called projection points P. When at least a projection point P thus obtained is located within the mid-thickness zone 7a, the mid-thickness zones 6 and 7 are defined as being in longitudinal continuity. Due to this longitudinal continuity, the inventor has found that the shear strain in the root is lowered when the weld is subjected to tensile efforts.

According to the invention, the joggled edge type configuration of the respective peripheral edge 2a, 3a of the first 2 and second 3 sheets having aluminium coating, as previously described, allows to manufacture a welded steel part with an Ultimate Tensile Stress higher than 700 MPa and ensures avoidance of fracture in the weld bead 4, as will be seen later in the examples.

In the welded steel part of the first variant of FIGS. 4 and 5, the upper face 2a1 of the peripheral edge 2a of the first sheet 2 and the upper face 3a31 of the welding portion 3a3 of the peripheral edge 3a of the second sheet 3 are parallel. This configuration is the preferred configuration notably because it makes it possible to produce a welded steel part for which the proximal zones of the weld bead 4 are in longitudinal alignment and gives the two sheets 2,3 a continuous plane surface on each side of the weld bead.

Figure 6:
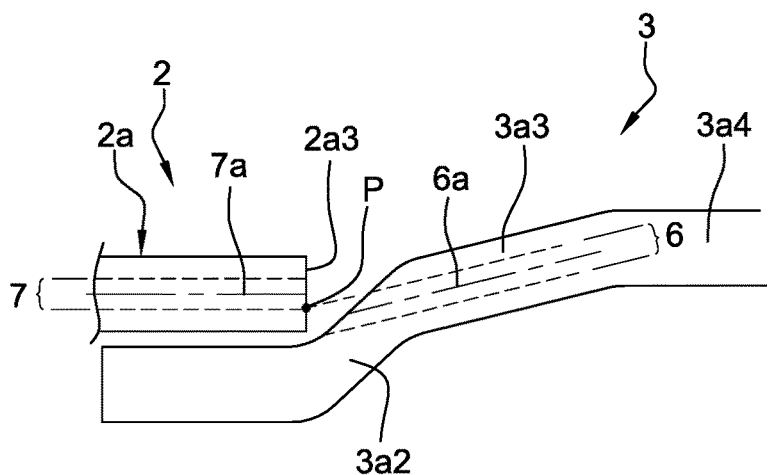
FIG. 6 shows schematically the welded steel part according to the invention in a second variant represented without the weld bead and for which the upper face of the peripheral edge of the first sheet is not parallel to the upper face of the welding section of the peripheral edge of the second sheet.

Alternatively and as shown in FIG. 6, the welding portion 3a3 is obliquely inclined relatively to the mid-thickness surface 7a of the first sheet 2. Nevertheless, the projection point P on the edge of 2a3 of the peripheral edge 2a of the first sheet 2 of at least one straight which is parallel to the mid-thickness surface zone 6 of the second sheet 3 and which is located within the corresponding mid-thickness zone 6, is located at the mid-thickness zone 7 of the first sheet 2. Such configuration enters in the general definition of the longitudinal continuity of the welding portion 3a3 of the peripheral edge 3a of the second sheet 3 with peripheral edge 2a of the first sheet 2 as given above. In such a configuration, it is the zone adjacent 3a4 to the welding portion 3a3 which ensures the flatness of the assembly in being parallel and/or within the longitudinal axis of the peripheral edge 2a of the first sheet 2.

In the welded steel part of the first variant of FIGS. 4 and 5, the first 2 and second 3 sheets have about the same thickness (i.e. that their thickness difference is less than 10%) and the upper face 2a1 of the peripheral edge 2a of the first sheet 2 and the upper face 3a31 of the welding portion 3a3 of the peripheral edge 3a of the second sheet 3 are in longitudinal alignment. This configuration is a preferential configuration in view of the thicknesses of the first 2 and the second 3 sheets, as in view of the longitudinal alignment of the upper face 2a1 of the peripheral edge 2a of the first sheet 2 with the upper face 3a31 of the welding portion 3a3 of the peripheral edge 3a of the second sheet 3. Regarding the thicknesses of the first 2 and second 3 sheets, this configuration corresponds to many industrial requirements. Regarding the longitudinal alignment of the upper face 2a1 of the peripheral edge 2a of the first sheet 2 with the upper face 3a31 of the welding portion 3a3 of the peripheral edge 3a of the second sheet 3, this configuration provides for the best flatness of the proximal zone of the welding zone and also provides the weld bead 4 a preferential positioning which will be detailed further on.

Figure 7:
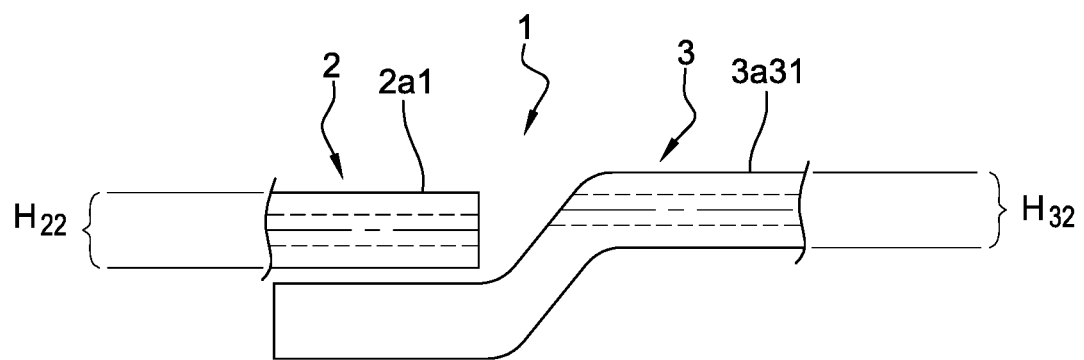
FIG. 7 shows schematically the welded steel part according to the invention in a third variant represented without the weld bead and for which the upper face of the peripheral edge is not longitudinally aligned with the upper face of the welding section of the peripheral edge of the second sheet.

Alternatively and as represented on FIG. 7, the upper face 2a1 of the peripheral edge 2a of the first sheet 2 and the upper face 3a31 of the welding portion 3a3 of the peripheral edge 3a of the second sheet 3 are parallel but are not in longitudinal alignment. Nevertheless in this variant, the thicknesses $H_{22}, H_{32}$ of the first 2 and second 3 sheets are equal.

Figure 8:
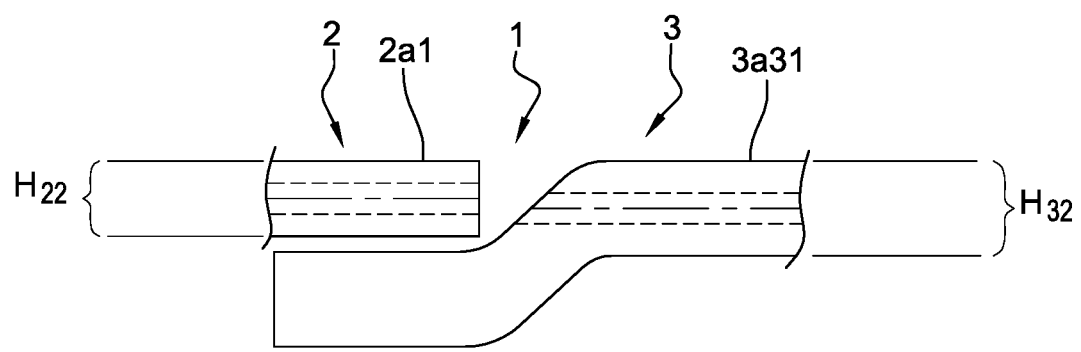
FIG. 8 shows schematically the welded steel part according to the invention in a fourth variant represented without the weld bead and for which the first and second sheets are of different thicknesses.

Alternatively and as represented in FIG. 8, the thickness $H_{22}$ of the first sheet 2 is smaller than the thickness $H_{32}$ of the second sheet 3. Nevertheless in this variant, the upper face 2a1 of the peripheral edge 2a of the first sheet 2 and the upper face 3a31 of the welding portion 3a3 of the peripheral edge 3a of the second sheet 3 are in longitudinal alignment.

Another variant not represented in the figures but being in the scope of the invention may combine the characteristics of the FIGS. 7 and 8, bearing in mind that the thicknesses $H_{22}, H_{32}$ of the first sheet and second sheets are equal and that the upper face 2a1 of the peripheral edge 2a of the first sheet 2 and the upper face 3a31 of the welding portion of the peripheral edge 3a of the second sheet 3, are parallel but not in longitudinal alignment, and that the respective mid-thickness zones (6, 7) are in longitudinal alignment.

Figure 1:
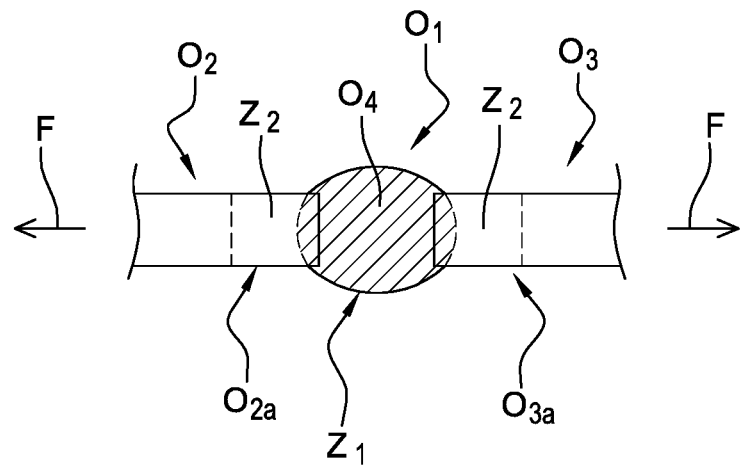
FIG. 1 already discussed shows schematically a welded steel part of the state of the art for which the first and second sheet plates are longitudinally aligned in accordance with the butt weld configuration, FIG. 2 already discussed shows schematically a welded steel part of the state of the art for which the first and second sheet plates are welded one above the other in accordance with the overlap configuration, FIG. 3 already discussed shows schematically the welded steel part of FIG. 2 which and the rotation occurring around the weld bead when the welded part is subjected to tensile efforts.
Figure 2:
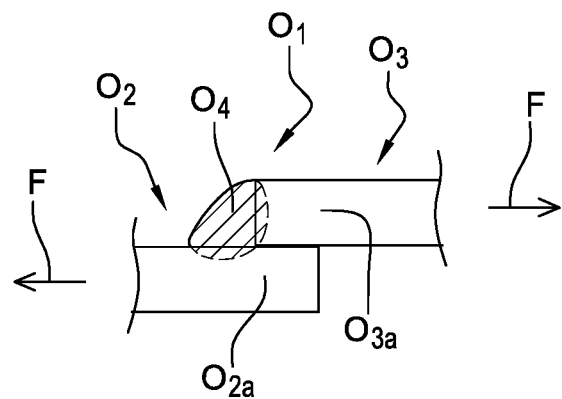
Figure 3:
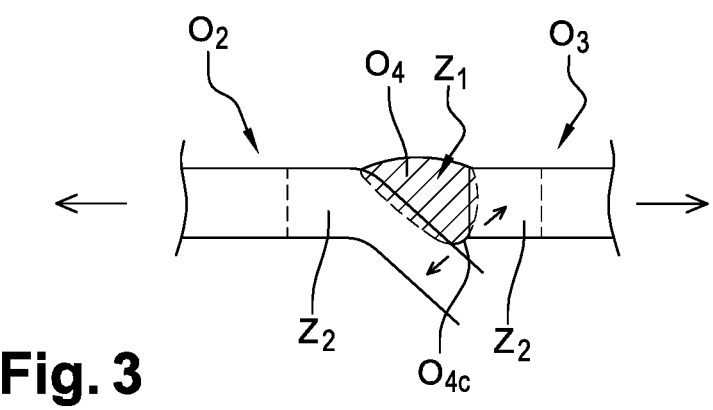
Figure 9:
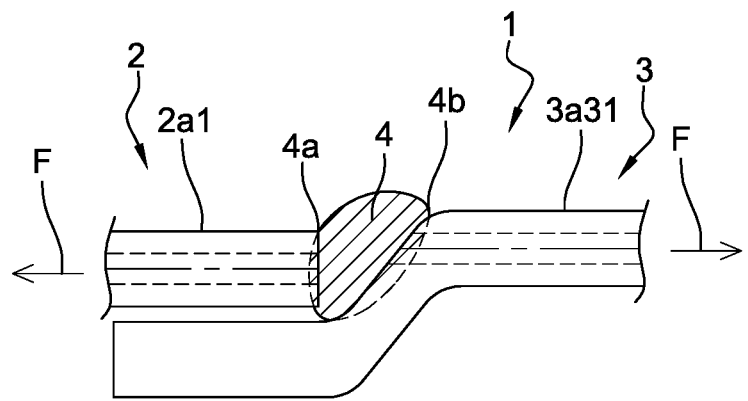
FIG. 9 shows schematically the welded steel part of FIG. 6 represented with the weld bead and for which the weld toes of the weld bead are not in longitudinal alignment.

Another characteristic to consider is the weld bead 4, and in particular the positioning of the opposite weld toes 4a-4b of the weld bead 4 respectively located on the upper face 2a1 of the peripheral edge 2a of the first sheet 2 and the upper face 3a31 of the peripheral edge 3a1 of the second sheet 3. When the upper face 2a1 of the peripheral edge 2a of the first sheet 2 and the upper face 3a31 of the welding portion 3a3 of the peripheral edge of the second sheet 3 are longitudinally aligned, as it is the case on the variant represented on FIG. 1, this allows the two opposite weld toes 4a, 4b of the weld bead 4 to be also in longitudinal alignment. Conversely, when the upper face 2a1 of the peripheral edge 2a of the first sheet 2 and the upper face of the welding portion 3a3 of the peripheral edge 3a of the second sheet 3 are not in longitudinal alignment as it is the case on the variant represented on FIG. 9, this can produce a longitudinal shift between the two opposite weld toes 4a, 4b of the weld bead 4. In another positioning not illustrated, the upper face 2a1 of the peripheral edge 2a of the first sheet 2 and the upper face 3a31 of the welding portion 3a3 of the peripheral edge of the second sheet 3 are longitudinally aligned while the two opposite weld toes 4a, 4b of the weld bead 4 are not in longitudinal alignment. The longitudinal alignment of the two opposite weld toes 4a, 4b of the weld bead 4 is preferred, in particular to limit an excessive rotation of the welded steel part 1 during tensile efforts, as described in reference to FIGS. 1 to 3 wherein the two tensile efforts applied in opposite directions are represented by the arrows F.

Figure 10:
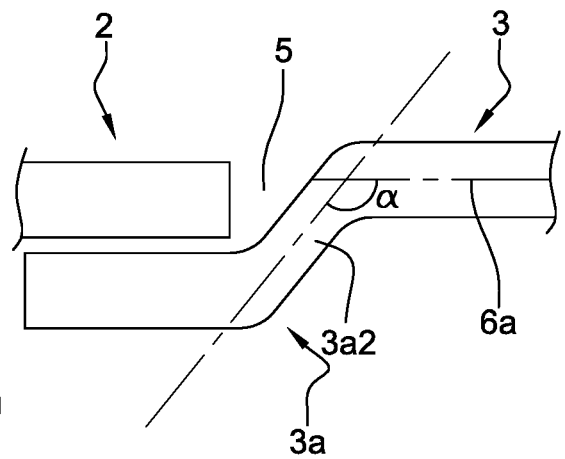
FIG. 10 shows schematically the angle $\alpha$ between the inclined section of the peripheral edge of the second sheet and the longitudinal mid-thickness surface of said second sheet applied to the welded steel part of the first variant of FIG. 4.

Referring to FIG. 10, another characteristic to consider is the angle α between the inclined junction portion 3a2 of the peripheral edge 3a of the second sheet 3 with the longitudinal mid-thickness surface 6a of said second sheet 3. The minimal value of a angle is 90 degrees. In this case, the groove 5 delimited by the upper face 3a21 of the inclined junction portion 3a2 and the edge 2a3 of the peripheral edge 2a of the first sheet 2 is small. This a angle must in any case be less than 180 degrees with regard to the joggled edge type configuration of the peripheral edge 2a,3a of the first 2 and second 3 sheets. When the α angle is high, the groove 5 is also large thus requiring a larger quantity of filler wire to achieve the weld. The forming of the peripheral edge 3a of the second sheet 3 must also be considered: this forming will be easier if the angle α is large.

Preferably, the angle α angle is comprised between 120 and 160 degrees. Such values allow to confer at the same time an easier forming of the peripheral edge 3a of the second sheet 3 and a groove 5 with a reasonable volume. Preferentially, the angle is comprised between 130 and 150 degrees.

The use for either one of the first and second sheets 2, 3 of a coating made of aluminum alloy causes, as indicated previously, the presence of ferrite in the welding bead 4 and particularly at the root of the welding bead 4. As previously explained, this presence of soft ferrite lowers the ultimate tensile shear stress of the weld bead 4. However, the inventor has brought out in a surprising way that the joggled edge type configuration of the peripheral edge 2a,3a of the first 2 and second 3 sheets of the welded steel part of the invention lowers the risk of fracture in the weld bead 4 when submitted to tensile stresses despite the presence of ferrite and the consequent weakening of the weld bead 4. As it will be detailed in the examples, the fracture of the welded steel part of the invention submitted to tensile efforts does not occur any more in the fused zone Z1 and is associated with higher UTS.

The first and second steel sheets 2 and 3 are steels sheets that have been aluminized and thereafter hot press formed. The aluminium coating layer makes it possible to prevent the steel substrate from oxidation and decarburization during the heating which preceded the press forming and the subsequent cooling in the press. The steel substrate of steel sheets 2 and 3 is a steel for thermal treatment, i.e. a steel from which it is possible to obtain structural hardening by martensite or bainite transformation after heating in the austenitic domain.

Preferentially, the microstructure of at least the first 2 and second 3 sheet after hot press forming contains martensite, which makes it possible to achieve UTS equal to or higher than 1000 MPa, and preferably higher than 1500 MPa.

In accordance with a first alternative, the chemical composition of the at least one of the first 2 and second 3 sheet comprises, in weight: 0.04≤C≤0.1%, 0.3%≤Mn≤2%, Si≤0.3%, Ti≤0.8%, 0.015%≤Nb≤0.1%, Cr, Ni, Cu, Mo≤0.1%, the remainder being iron and unavoidable impurities. According to this alternative, the steel sheet comprising such a composition has a mechanical resistance UTS after hot press forming of approximately 500 MPa.

In accordance with a second alternative, the chemical composition of at least one of the first 2 and second 3 sheet of the welded steel part of the invention comprises of, in weight: 0.06≤C≤0.10%, 1.4%≤Mn≤1.9%, 0.2%≤Si≤0.5%, 0.020%≤Al≤0.070%, 0.02%≤Cr≤0.1% wherein: 1.5%≤(C+Mn+Si+Cr)≤2.7%, 0.040%≤Nb≤0.060%, 3.4×N≤Ti≤8×N, wherein: 0.044%≤(Nb+Ti)≤0.090%, 0.0005≤B≤0.004%, 0.001%≤N≤0.009%, 0.0005%≤S≤0.003%, 0.001%≤P≤0.020%, optionally: 0.0001%≤Ca≤0.003%, the remainder being iron and unavoidable impurities. According to this alternative, the steel sheet comprising such a composition has a mechanical resistance UTS after hot press forming of approximately 1000 MPa.

In accordance with a third alternative, the chemical composition of at least one of the first 2 and second 3 sheet of the welded steel part of the invention comprises of, in weight: 0.20≤C≤0.25%, 1.1%≤Mn≤1.4%, 0.15%≤Si≤0.35%, 0.020%≤Al≤0.070%, Cr≤0.3%, 0.020%≤Ti≤0.060%, B<0.010%, the remainder being iron and unavoidable impurities. According to this alternative, the steel sheet comprising such a composition has a mechanical resistance UTS after hot press forming of approximately 1500 MPa.

In accordance with a fourth alternative, the chemical composition of at least one of the first 2 and second 3 sheet of the welded steel part of the invention comprises, in weight: 0.24%≤C≤0.38%, 0.40%≤Mn≤3%, 0.10%≤Si≤0.70%, 0.015≤Al≤0.070%, 0%≤Cr≤2%, 0.25%≤Ni≤2%, 0.015%≤Ti≤0.10%, 0%≤Nb≤0.060%, 0.0005%≤B≤0.0040%, 0.003%≤N≤0.010%, 0.0001%≤S≤0.005%, 0.0001%≤P≤0.025%, it being understood that the titanium and nitrogen content satisfy: Ti/N>3.42, and the carbon, manganese, chromium and silicon contents satisfy $$2.6C + \frac{Mn}{5.3} + \frac{Cr}{13} + \frac{Si}{15} \geq 1.1\%,$$

the chemical composition optionally comprising one or more of the following elements: 0.05%≤Mo≤0.65%, 0.001%≤W≤0.30%%, 0.0005%≤Ca≤0.005%, the remainder consisting of iron and unavoidable impurities originating from the production, the sheet containing a nickel content $Ni_{surf}$ in the region of the surface of said sheet over a depth Δ, such that: $Ni_{surf} > Ni_{nom}$, $Ni_{nom}$ denoting the nominal nickel content of the steel, and such that $Ni_{max}$ denoting the maximum nickel content within Δ:

$$\frac{(Ni_{max} + Ni_{nom})}{2} \times (\Delta) \geq 0.6,$$

and such that:

$$\frac{(Ni_{max} - Ni_{nom})}{\Delta} \geq 0.01,$$

the depth Δ being expressed in micrometers, the $Ni_{max}$ and $Ni_{nom}$ contents being expressed as weight percentages. According to this alternative, the steel sheet comprising such a composition has a mechanical resistance UTS after hot press forming higher than 1800 MPa.

Advantageously, the first 2 and second 3 sheets have the same chemical composition.

The welded steel part of the invention may present the range of thickness required for the manufacture of welded steel parts in the automobile field and more particularly for making suspension arms and/or chassis parts of motor vehicles. To this end, the thickness of the first 2 and second 3 sheets is comprised between 1.5 and 4 mm.

The chemical composition of the first 2 and second 3 sheets may be according to the above described alternatives with a thickness 6b,7b of said first 2 and second 3 sheets which is comprised between 1.5 and 3 mm. As it will be seen in the examples, such a steel part has a mechanical resistance of more than 800 MPa.

The chemical composition of first 2 and second 3 sheets may also be according to the second, third and fourth alternatives with a thickness 6b,7b of said first 2 and second 3 sheets comprised between 2 and 4 mm. As will be seen in the examples, such a steel part has a mechanical strength (UTS) of more than 700 MPa. This range of thicknesses allows notably for the manufacture of chassis and structural parts of motor vehicles which are usually thicker.

Figure 11:
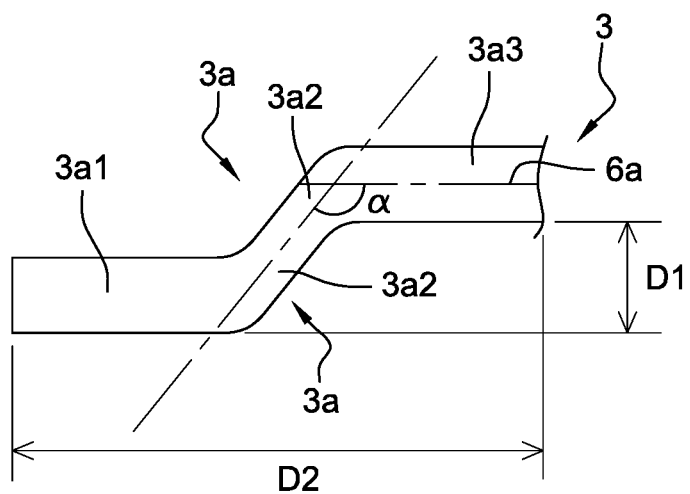
FIG. 11 shows schematically the hot-pressed steel part of the invention which can be used as the second sheet in the welded steel part of the invention.

In reference to FIG. 11, the invention also concerns a hot-pressed formed part used as the second sheet 3 in the welded steel part of the invention. As for the second sheet 3 of FIGS. 4 to 10, said hot pressed form part is in a joggled edge type configuration wherein the peripheral edge 3a of said part 3 comprises an end portion 3a1 which is extended by an inclined junction portion 3a2 extending by a central portion 3a3. In the hot-pressed formed part of the invention, the central portion 3a3 is parallel to the end portion 3a1. The transversal distance D1 between the end portion 3a1 and the central portion 3a3 is no more than 10 millimeters. Moreover, the added length D2 of the end portion 3a1 and of the inclined junction portion 3a2 is no more than 50 millimeters. Finally, the inclined junction portion 3a2 forms an angle α with the central portion 3a3 which is comprised between 120 and 160°, preferably between 130 and 150°. This allows the hot-pressed form part of the invention to be used as second sheet in the welded steel part of the invention in view of manufacturing parts for automobile field.

Preferentially, the microstructure of the second sheet 3 after hot press forming contains martensite, which makes it possible to achieve UTS equal to or higher than 1000 MPa, and preferably higher than 1500 MPa.

In accordance with a first alternative and in accordance with above, the chemical composition of the second sheet 3 comprises, in weight: 0.04≤C≤0.1%, 0.3%≤Mn≤2%, Si≤0.3%, Ti≤0.8%, 0.015%≤Nb≤0.1%, Cr, Ni, Cu, Mo≤0.1%, the remainder being iron and unavoidable impurities. According to this alternative, the steel sheet 3 comprising such a composition has a mechanical resistance UTS after hot press forming of approximately 500 MPa.

In accordance with a second alternative and in accordance with above, the chemical composition of the second sheet 3 of the welded steel part of the invention comprises of, in weight: 0.06≤C≤0.10%, 1.4%≤Mn≤1.9%, 0.2%≤Si≤0.5%, 0.020%≤Al≤0.070%, 0.02%≤Cr≤0.1% wherein: 1.5%≤(C+Mn+Si+Cr)≤2.7%, 0.040%≤Nb≤0.060%, 3.4×N≤≤Ti≤8×N, wherein: 0.044%≤(Nb+Ti)≤0.090%, 0.0005≤B≤0.004%, 0.001%≤N≤0.009%, 0.0005%≤S≤0.003%, 0.001%≤P≤0.020%, optionally: 0.0001%≤Ca≤0.003%, the remainder being iron and unavoidable impurities. According to this alternative, the steel sheet 3 comprising such a composition has a mechanical resistance UTS after hot press forming of approximately 1000 MPa.

In accordance with a third alternative and in accordance with above, the chemical composition of the second sheet 3 of the welded steel part of the invention comprises of, in weight: 0.20≤C≤0.25%, 1.1%≤Mn≤1.4%, 0.15%≤Si≤0.35%, 0.020%≤Al≤0.070%, Cr≤0.3%, 0.020%≤Ti≤0.060%, B<0.010%, the remainder being iron and unavoidable impurities. According to this alternative, the steel sheet 3 comprising such a composition has a mechanical resistance UTS after hot press forming of approximately 1500 MPa.

In accordance with a fourth alternative and in accordance with above, the chemical composition of the first 2 second sheet 3 of the welded steel part of the invention comprises, in weight: 0.24%≤C≤0.38%, 0.40%≤Mn≤3%, 0.10%≤Si≤0.70%, 0.015≤Al≤0.070%, 0%≤Cr≤2%, 0.25%≤Ni≤2%, 0.015%≤Ti≤0.10%, 0%≤Nb≤0.060%, 0.0005%≤B≤0.0040%, 0.003%≤N≤0.010%, 0.0001%≤S≤0.005%, 0.0001%≤P≤0.025%, it being understood that the titanium and nitrogen content satisfy: Ti/N>3.42, and the carbon, manganese, chromium and silicon contents satisfy $$2.6\,C + \frac{Mn}{5.3} + \frac{Cr}{13} + \frac{Si}{15} \geq 1.1\%,$$

the chemical composition optionally comprising one or more of the following elements: 0.05%≤Mo≤0.65%, 0.001%≤W≤0.30%%, 0.0005%≤Ca≤0.005%, the remainder consisting of iron and unavoidable impurities originating from the production, the sheet containing a nickel content $Ni_{surf}$ in the region of the surface of said sheet over a depth Δ, such that: $Ni_{surf} > Ni_{nom}$, $Ni_{nom}$ denoting the nominal nickel content of the steel, and such that $Ni_{max}$ denoting the maximum nickel content within Δ:

$$\frac{(Ni_{max} + Ni_{nom})}{2} \times (\Delta) \geq 0.6,$$

and such that:

$$\frac{(Ni_{max} + Ni_{nom})}{\Delta} \geq 0.01,$$

the depth Δ being expressed in micrometres, the $Ni_{max}$ et $Ni_{nom}$ contents being expressed as weight percentages. According to this alternative, the steel sheet 3 comprising such a composition has a mechanical resistance UTS after hot press forming higher than 1800 MPa.

Preferably, the hot pressed steel part comprises a coating of aluminum alloy, said aluminium alloy being defined as containing at least 30% of aluminium by weight in average, as measured with respect to the coating layer.

Figure 12A:
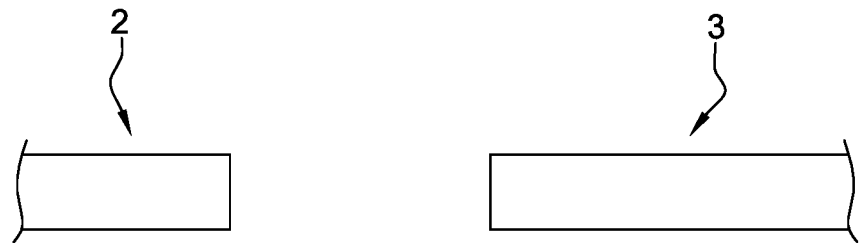
FIGS. 12a, 12b, 12c, 12d, 12e show schematically the main steps of the method of the invention.
Figure 12B:
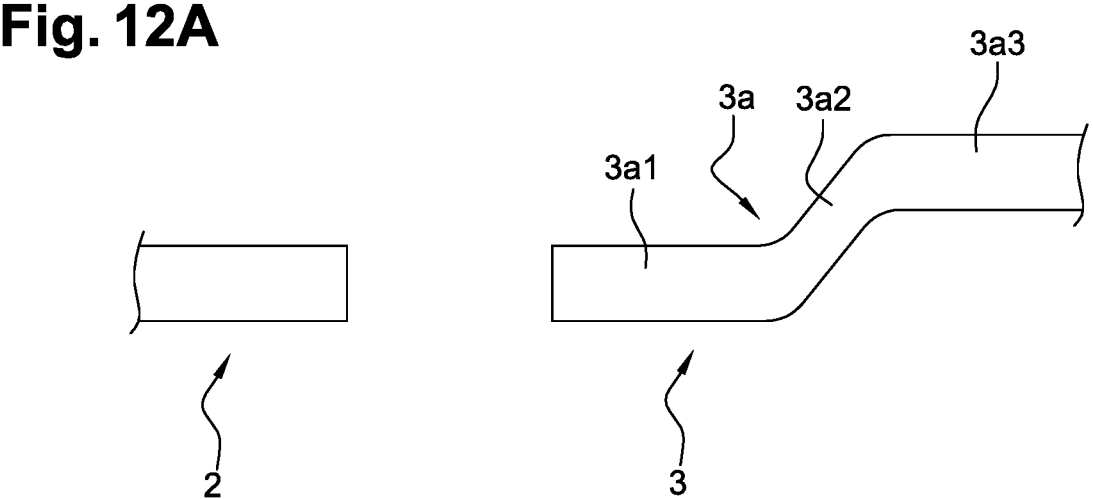
Figure 12C:
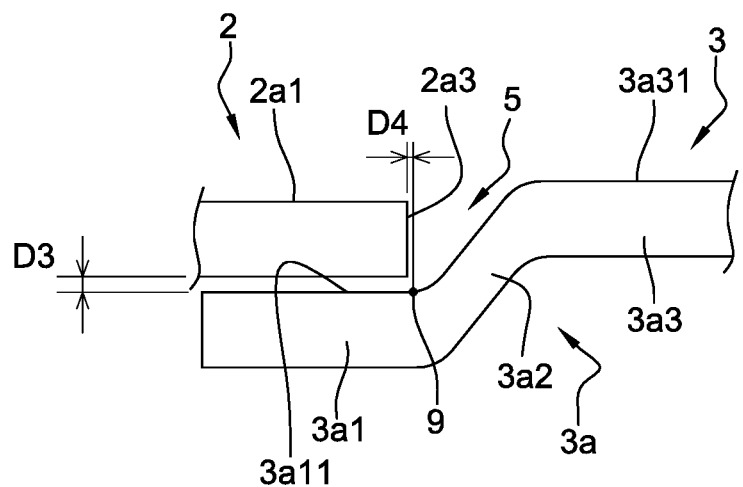
Figure 12D:
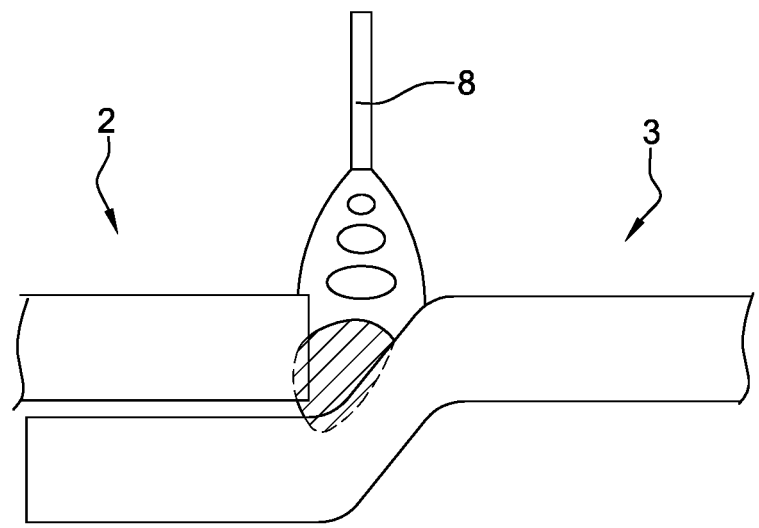
Figure 12E:
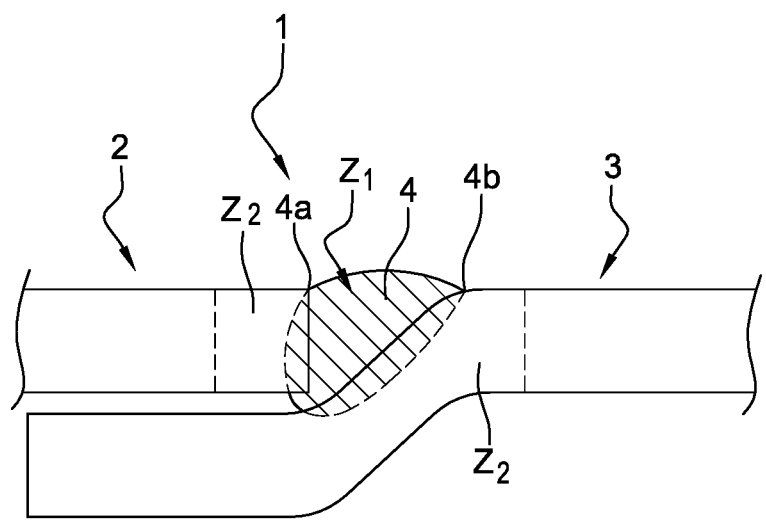

In reference to FIGS. 12a to 12e, the method of the invention of manufacturing a welded steel part as previously described comprises the steps of i) supplying the first 2 and a second 3 steel sheets (FIG. 12a), ii) deforming the peripheral edge 3a of the second steel sheet 3 to create an end portion 3a1 which is extended by an inclined junction portion 3a2 to a welding portion 3a3 (FIG. 12b), iii) positioning the peripheral edge 2a of the first sheet 2 above, and on or near the upper face 3a11 of the end portion 3a1 of the peripheral edge 3a of the second sheet 3 so as to create the groove 5 (FIG. 12c), iv) welding the first 2 and second 3 steel sheets (FIG. 12d) thus positioned by using a filler wire 8 which is deposited in the previously made groove 5, the end portion 3a1 of the peripheral edge 3a of the second sheet 3 then being a welding support sheet, thereby obtaining a welded steel part according to the invention (FIG. 12e).

The step ii) may be carried out by cold forming, bending or by hot press forming prior to the step of supplying the first and second steel sheets. Preferably, the step ii) is carried out at the same time as the hot forming step of said second sheet 3. Thanks to this former configuration, the forming of the second sheet 3 and the forming of the peripheral edge 3a of this second sheet 3 can be prepared in a single step.

In reference to FIG. 12c, the step iii) is carried out by spacing the peripheral edge 2a of the first sheet 2 from the end portion 3a1 of the peripheral edge 3a of the second sheet 3 with a maximal gap D3 of 2 millimeters. Above 2 mm, the resulting welded steel part would present a misalignment of the central fibres involving a low mechanical resistance.

Also in reference to FIG. 12c, the edge 2a3 of the first sheet 2 is arranged at the junction 9 between the end portion 3a1 and the inclined junction portion 3a2 of the peripheral edge 3a of the second sheet 3 at a maximum distance D4 of 3 mm from this junction 9 on the side of the said end portion 3a1. Above 3 mm, the large volume of the groove 5 would be detrimental to both welding operation and final mechanical properties.

Still in reference to FIG. 12c, when positioning the peripheral edge 2a on the end portion 3a1 of the peripheral edge 3a of the second sheet 3, the upper face 2a1 of the peripheral edge 2a of the first sheet 2 and the upper face 3a31 of the welding portion 3a3 of the peripheral edge 3a of the second sheet 3 are preferably arranged in longitudinal alignment to be in line for the advantages previously explained.

Concerning now the step of welding the first 2 and second 3 steel sheets, the welding process may be an arc welding process, a laser welding process or a hybrid laser welding process combining Laser and arc. When the welding process is an arc welding process, it may be Gas Metal Arc Welding (GMAW), Gas Tungsten Arc Welding (GTAW) or Plasma Arc Welding (PAW).

The chemical composition of the filler wire may comprise of, in weight percent:

0.03≤C≤0.14%, 0.9≤Mn≤2.1% and 0.5≤Si≤1.30%, the remainder being iron and unavoidable impurities The diameter of the filler wire 9 is preferably comprised between 0.8 and 2 mm.

Finally, when the welding process is an arc welding process, the welding speed is less than 1.5 m/min, and the linear welding energy is comprised between 1.5 and 10 kJ/cm.

The two examples below show the results of mechanical tests carried out on the welded steel part of the invention elaborated from a first sheet 2 and a second sheet 3 of the same chemical composition corresponding to the third alternative which comprises, in weight: 0.22 C, 1.16% Mn, 0.26%≤Si; 0.030% Al, 0.17% Cr, 0.035% Ti, 0.003% B, 0.001% S, 0.012% P, the remainder being iron and unavoidable impurities.

Example 1

The welded steel part of this example is elaborated from two hot press formed sheets of the same thickness of 2.5 mm. Each sheet has been previously hot pressed after heating at 900° C. during 8 minutes. The sheets are coated with aluminium alloy, the thickness of the coating being about 50 μm on each face.

TABLE 1

Tensile tests results obtained on a welded steel part of the invention having a thickness of 2.5 mm, joined by Gas Metal Arc Welding (GMAW)

|  | Filler wire in reference to the standard AWS-A5.28 | UTS of filler wire (MPa) | Linear Heat input (kJ/cm) | Welding speed (mm/mn) | UTS of the welded steel part (MPa) | Fracture location |
|---|---|---|---|---|---|---|
| Example 1A | ER70S-G | 530 | 5 | 500 | 831 | Out of the weld bead |
| Example 1B | ER70S-G | 530 | 4.3 | 600 | 844 | Out of the weld bead |
| Example 1C | ER120S-G | 960 | 4.1 | 600 | 878 | Out of the weld bead |

The second sheet 3 is formed by a hot forming operation carried out with adapted tools.

The joggled edge configuration of the first 2 and second 3 sheets is as shown in FIGS. 4 and 12e, therefore falling in the general definition of the welded steel part of the invention wherein notably the welding portion 3a3 of the peripheral edge 3a of the second sheet 3 is in longitudinal continuity with the peripheral edge 2a of the first sheet 2, In the three examples 1A, 1B and 1C, the rupture of the welded steel part occurs at about 2 mm of the weld toe 4b, always outside of the weld bead since the invention avoids excessive strain concentration in the root of the weld bead which comprises ferrite, due to the aluminium resulting from melting of the coating.

In the three examples 1A, 1B and 1C, the Ultimate Tensile Stress is clearly higher than 700 MPa close to the mechanical resistance obtained for the technique of butt welding (between 880 and 910 MPa) and well above the mechanical resistance achieved for the overlap welding technique, which is about 740 MPa.

Example 2

The welded steel part of this example is obtained by the joining of two hot-press formed sheets of the same thickness of 3.2 mm, having an aluminium coating of about 50 μm on the surface.

TABLE 2

Tensile tests results obtained on a welded steel part of the invention
having a thickness of 3.2 mm, joined by Gas Metal Arc Welding (GMAW)

|  | Filler wire in reference to the standard AWS-A5.28 | UTS of the filler wire (MPa) | Linear welding energy (kJ/cm) | Welding speed (mm/mn) | UTS of the welded steel part - MPa) | Zone of fracture |
|---|---|---|---|---|---|---|
| Example 2A | ER70S-G | 530 | 7.6 | 500 | 712 | HAZ |
| Example 2B | ER120S-G | 960 | 7.5 | 500 | 750 | HAZ |

The configuration and forming of the first 2 and second 3 sheets as well as the operations of the welding conditions are identical to those presented in example 1.

In the two examples 2A, 2B, the rupture occurs outside of the weld bead and more precisely in reference to FIG. 12e on the side of the second sheet 3 at the level at the weld toe 4b. This rupture occurs systematically outside of the weld bead contrary to the above discussed cases of overlap welding.

In the two examples 2A,2B, the Ultimate Tensile Stress is greater than the target of 700 MPa and well above the mechanical resistance obtained for the technique of overlap welding for the same sheet thicknesses (about 550 MPa). If the mechanical resistance remains lower than that obtained for the butt welding technique, this is due to a slight misalignment of the opposite weld toes 4a-4b which causes a decrease of Ultimate Tensile Stress. Nevertheless, the systematic fracture outside of the weld bead and the presence of a natural support for making the welding (second sheet 3) involve advantageous properties of the welded steel part of the invention.

Thus, the invention makes it possible to use the welded part according to the invention for the manufacturing of suspension arms or chassis parts for the automotive industry.

What is claimed is:

1. A method of manufacturing a welded steel part, the method comprising the steps of:
   i) supplying a first and a second steel sheets, at least one of the first and second steel sheets being made of a steel substrate and comprising a coating of aluminum alloy, wherein the at least one of the first and second steel sheets is a hot-pressed formed part;
   ii) deforming a peripheral edge of the second steel sheet to create an end portion extended by an inclined junction portion to a welding portion;
   iii) positioning a peripheral edge of the first steel sheet above, and on or near an upper face of the end portion of the peripheral edge of the second steel sheet so as to create a groove laterally delimited by at least one part of an upper surface of the inclined junction portion of the peripheral edge of the second steel sheet and an edge of the peripheral edge of the first steel sheet,
   the inclined joining portion extending by a welding portion in longitudinal continuity with the peripheral edge of the first steel sheet,
   the longitudinal continuity being defined by a longitudinal alignment of at least part of a mid-thickness zone of the welding portion with at least part of a mid-thickness zone of the peripheral edge of the first steel sheet,
   the longitudinal alignment of the mid-thickness zones being defined by a position on the edge of the peripheral edge of the first steel sheet of a projection point of at least one straight line parallel to the mid-thickness surface zone of the second steel sheet and located in the corresponding mid-thickness zone, the position being located within the mid-thickness zone of the first steel sheet,
   each of the mid-thickness zones being defined in cross section by a zone centered on the mid-thickness of the corresponding steel sheet and having a thickness equal to 40% of the thickness of the respective first and second steel sheets; and
   iv) welding the first and second steel sheets thus positioned by using a filler wire deposited in the groove, the filler wire after melting and cooling, constituting a weld bead connecting the first steel sheet to the second steel sheet and being part of the welded steel part, the end portion of the peripheral edge of the second steel sheet being a welding support sheet.

2. The method as recited in claim 1 wherein the step of deforming the peripheral edge of the second steel sheet is carried out by cold forming or bending.

3. The method as recited in claim 1 wherein the step of deforming the peripheral edge of the second steel sheet is carried out by hot press forming prior to the step of supplying the first and second steel sheets.

4. The method as recited in claim 3 wherein the step of hot press forming of the peripheral edge of the second steel sheet is carried out at the same time as a hot press forming step of the second steel sheet.

5. The method as recited in claim 1 wherein the chemical composition of at least one of the first and second steel sheets comprises, in weight: 0.20≤C≤0.25%, 1.1%≤Mn≤1.4%, 0.15%≤Si≤0.35%, 0.020%≤Al≤0.070%, Cr≤0.3%, 0.020%≤Ti≤0.060%, and B≤0.010%, a remainder being iron and unavoidable impurities.

6. The method as recited in claim 1 wherein a chemical composition of at least one of the first and second steel sheets comprises, in weight: 0.24%≤C≤0.38%, 0.40%≤Mn≤3%, 0,10%≤Si≤0.70%, 0.015%≤Al≤0.070%, 0%≤Cr≤2%, 0.25%≤Ni≤2%, 0.015%≤Ti≤0.10%, 0%≤Nb≤0.060%, 0.0005%≤B≤0.0040%, 0.003%≤N≤0.010%, 0.0001%≤S≤0.005%, 0.0001%≤P≤0.025%, it being understood that the titanium and nitrogen content satisfy Ti/N>3.42, and that the carbon, manganese, chromium and silicon contents satisfy $$2.6C + \frac{Mn}{5.3} + \frac{Cr}{13} + \frac{Si}{15} \geq 1.1\%,$$

the chemical composition optionally comprising one or more of the following elements: 0.05%≤Mo≤0.65%, $0.001\% \leq W \leq 0.30\%$, $0.0005\% \leq Ca \leq 0.005\%$, a remainder consisting of iron and unavoidable impurities originating from processing, the sheet containing a nickel content $Ni_{surf}$ in the region of the surface of the first or second sheet with the chemical composition over a depth $\Delta$, such that: $Ni_{surf} > Ni_{nom}$, $Ni_{nom}$ denoting the nominal nickel content of the steel, and such that $Ni_{max}$ denoting the maximum nickel content within $\Delta$:

$$\frac{(Ni_{max} + Ni_{nom})}{2} \times (\Delta) \geq 0.6,$$

and such that:

$$\frac{(Ni_{max} + Ni_{nom})}{\Delta} \geq 0.01,$$

the depth $\Delta$ being expressed in micrometers, the $Ni_{max}$ and $Ni_{nom}$ contents being expressed as weight percentages.

7. The method as recited in claim 1 wherein the welding process is an arc welding process, a laser welding process or a hybrid laser welding process using a shielding gas.

8. The method as recited in claim 7 wherein the welding process the arc welding process and the arc welding process is Gas Metal Arc Welding, Gas Tungsten Arc Welding or Plasma Arc Welding.

9. The method as recited in claim 1 wherein the chemical composition of the filler wire comprises, in weight $0.03 \leq C \leq 0.14\%$, $0.9 \leq Mn \leq 2.1\%$ and $0.5 \leq Si \leq 1.30\%$, a remainder being iron and unavoidable impurities.

10. The method as recited in claim 1 wherein a diameter of the filler wire is between 0.8 and 2 mm.

11. The method as recited in claim 1 wherein the welding process is performed with a welding speed less than 1.5 m/min, and the linear welding energy is between 1.5 and 10 kJ/cm.

* * * * *